United States Patent
Kochura et al.

(10) Patent No.: US 11,966,854 B2
(45) Date of Patent: Apr. 23, 2024

(54) KNOWLEDGE GRAPH FOR DETERMINING A RESOURCE VENDOR FROM WHICH TO LEASE RESOURCES

(71) Applicant: International Business Machines Corporation, Armonk, NY (US)

(72) Inventors: Nadiya Kochura, Bolton, MA (US); Indervir Singh Banipal, Austin, TX (US); Shikhar Kwatra, San Jose, CA (US); Sourav Mazumder, San Ramon, CA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 17/900,270

(22) Filed: Aug. 31, 2022

(65) Prior Publication Data
US 2024/0070483 A1    Feb. 29, 2024

(51) Int. Cl.
*H04L 41/0894* (2022.01)
*G06F 16/901* (2019.01)
(Continued)

(52) U.S. Cl.
CPC ......... *G06N 5/022* (2013.01); *G06F 16/9024* (2019.01); *H04L 41/0894* (2022.05); *H04L 41/16* (2013.01); *H04L 41/5006* (2013.01)

(58) Field of Classification Search
CPC . G06N 5/022; G06F 16/9024; H04L 41/0894; H04L 41/16; H04L 41/5006
(Continued)

(56) References Cited

U.S. PATENT DOCUMENTS

| 8,606,924 B2 | 12/2013 | Gujral et al. |
| 9,015,324 B2 | 4/2015 | Jackson |

(Continued)

FOREIGN PATENT DOCUMENTS

| CN | 106056294 A | 10/2016 |
| EP | 3270289 A3 | 2/2018 |
| TW | 201201104 A | 1/2012 |

OTHER PUBLICATIONS

Borkowski et al., "Predicting Cloud Resource Utilization," IEEE/ACM 9th International Conference on Utility and Cloud Computing, 2016, pp. 37-42.
Pham et al., "Predicting Workflow Task Execution Time in the Cloud Using a Two-Stage Machine Learning Approach," IEEE Transactions on Cloud Computing, vol. 8, No. 1, Jan.-Mar. 2020, pp. 256-268.
(Continued)

*Primary Examiner* — Karen C Tang
(74) *Attorney, Agent, or Firm* — Zilka-Kotab, P.C.

(57) ABSTRACT

A computer-implemented method according to one embodiment includes building a knowledge graph of resource vendors. The method further includes identifying resources that are in relatively short supply in a host system, and determining, using a matching algorithm, a first of the resource vendors in the knowledge graph from which to temporarily lease the identified resources to the host system. The first resource vendor includes the identified resources and satisfies policy prerequisites of the host system. A lease is caused to be issued, from the first resource vendor to the host system, for the identified resources. A computer program product according to another embodiment includes a computer readable storage medium having program instructions embodied therewith. The program instructions are readable and/or executable by a computer to cause the computer to perform the foregoing method.

19 Claims, 7 Drawing Sheets

(51) Int. Cl.
*G06N 5/022* (2023.01)
*H04L 41/16* (2022.01)
*H04L 41/5006* (2022.01)

(58) Field of Classification Search
USPC .......................................................... 709/224
See application file for complete search history.

(56) References Cited

U.S. PATENT DOCUMENTS

| | | | |
|---|---|---|---|
| 9,229,771 | B2 | 1/2016 | Armour et al. |
| 10,244,002 | B2 | 3/2019 | Hoy et al. |
| 10,650,424 | B2 | 5/2020 | Kolluri Venkata Sesha et al. |
| 2006/0294238 | A1 | 12/2006 | Naik et al. |
| 2011/0137805 | A1 | 6/2011 | Brookbanks et al. |
| 2011/0145392 | A1 | 6/2011 | Dawson et al. |
| 2011/0292792 | A1* | 12/2011 | Zuo .......................... H04L 65/80 370/230 |
| 2015/0074749 | A1 | 3/2015 | Vasko et al. |
| 2016/0330137 | A1* | 11/2016 | Avci ....................... G06F 9/5061 |
| 2020/0073717 | A1* | 3/2020 | Hari ....................... G06F 9/5061 |
| 2021/0311805 | A1* | 10/2021 | Nakamura ............. G06F 9/4881 |
| 2022/0207241 | A1* | 6/2022 | Bettencourt-Silva ......................... G06Q 50/26 |

OTHER PUBLICATIONS

Anderson, P., "IBM announces new industry-leading NLP features inside Watson Discovery," IBM Watson Blog, Dec. 4, 2019, 6 pages, retrieved from https://www.ibm.com/blogs/watson/2019/12/ibm-announces-new-industry-leading-nlp-features-inside-watson-discovery/.

Cloud Standards Customer Council, "Cloud Security Standards: What to Expect & What to Negotiate Version 2.0," Cloud Standards Customer Council, Aug. 2016, 36 pages, retrieved from https://www.omg.org/cloud/deliverables/CSCC-Cloud-Security-Standards-What-to-Expect-and-What-to-Negotiate.pdf.

Microsoft, "Configure device redirection," Microsoft Azure, Aug. 24, 2022, 5 pages, retrieved from https://docs.microsoft.com/en-us/azure/virtual-desktop/configure-device-redirections.

Gillis, A., "What is cloud bursting," TechTarget, Jun. 2021, 4 pages, retrieved from https://www.techtarget.com/searchcloudcomputing/definition/cloud-bursting#:~:text=Cloud%20bursting%20is%20an%20application,more%20computing%20resources%20when%20needed.

Chu et al., "Resource scheduling in a private cloud environment: an efficiency priority perspective," Kybernetes, vol. 45, No. 10, 2016, pp. 1524-1541.

* cited by examiner

302 — Perform a query for resource vendors that reside on one or more clouds of one or more external providers 304 — Build a knowledge graph of the resource vendors 306 — Determine policy prerequisites of a host system 308 — Identify resources that are in relatively short supply in the host system 310 — Determining, using a matching algorithm, a first of the resource vendors in the knowledge graph from which to temporarily lease the identified resources to the host system 312 — Cause a lease to be issued, from the at least one resource vendor to the host system, for the identified resources
```

KNOWLEDGE GRAPH FOR DETERMINING A RESOURCE VENDOR FROM WHICH TO LEASE RESOURCES

BACKGROUND

The present invention relates to hybrid clouds, and more specifically, this invention relates to using a knowledge graph for determining a resource vendor from which to at least temporarily lease resources.

A hybrid cloud generally includes a cloud infrastructure which may include two or more clouds that inter-operate or federate through technology. Certain artificial intelligence (AI) applications can be executed on the private cloud. However, in some cases in which requested resources are not available, the resources, e.g., storage, computing, network, etc., may be requested from a public cloud. These public cloud resources are typically requested only for the purposes of satisfying a particularly large workload need, and may be released after the workload is completed.

SUMMARY

A computer-implemented method according to one embodiment includes building a knowledge graph of resource vendors. The method further includes identifying resources that are in relatively short supply in a host system, and determining, using a matching algorithm, a first of the resource vendors in the knowledge graph from which to temporarily lease the identified resources to the host system. The first resource vendor includes the identified resources and satisfies policy prerequisites of the host system. A lease is caused to be issued, from the first resource vendor to the host system, for the identified resources.

A computer program product according to another embodiment includes a computer readable storage medium having program instructions embodied therewith. The program instructions are readable and/or executable by a computer to cause the computer to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a knowledge graph for determining a resource vendor from which at least temporarily lease resources.

In one general embodiment, a computer-implemented method includes building a knowledge graph of resource vendors. The method further includes identifying resources that are in relatively short supply in a host system, and determining, using a matching algorithm, a first of the resource vendors in the knowledge graph from which to temporarily lease the identified resources to the host system. The first resource vendor includes the identified resources and satisfies policy prerequisites of the host system. A lease is caused to be issued, from the first resource vendor to the host system, for the identified resources.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
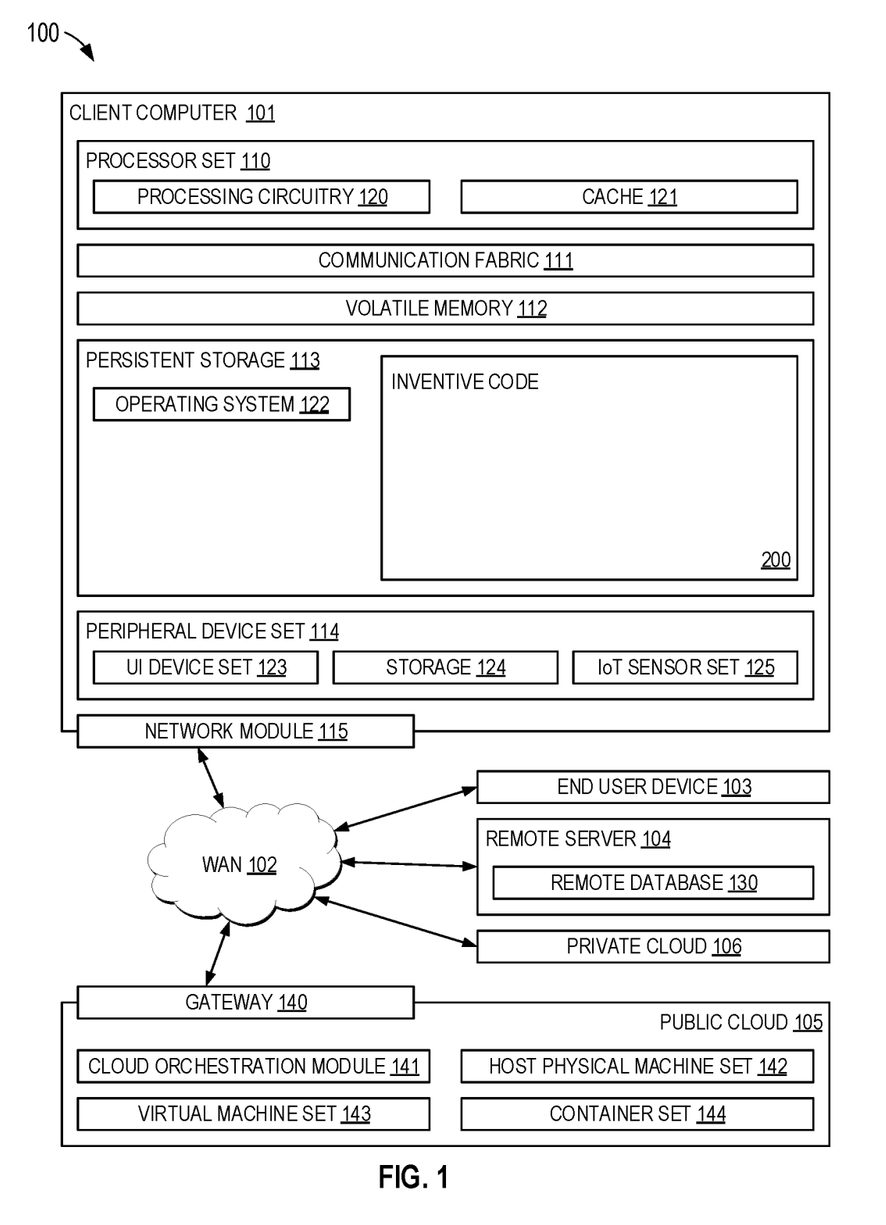
FIG. 1 is a diagram of a computing environment, in accordance with one embodiment of the present invention.

Computing environment 100 contains an example of an environment for the execution of at least some of the computer code involved in performing the inventive methods, such as inventive code of block 200 for using a knowledge graph to determine a resource vendor from which to at least temporarily lease resources. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
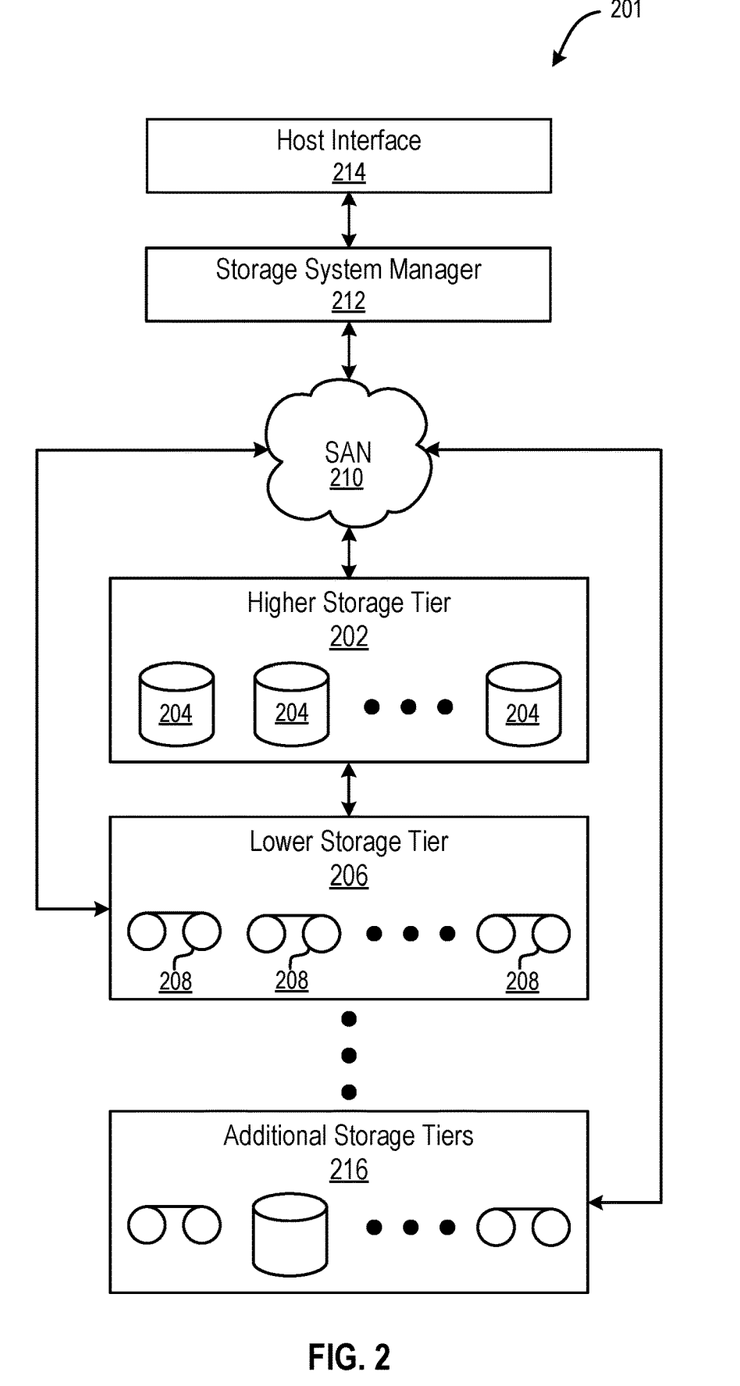
FIG. 2 is a diagram of a tiered data storage system, in accordance with one embodiment of the present invention.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

A hybrid cloud generally includes a cloud infrastructure which may include two or more clouds that inter-operate or federate through technology. Certain AI applications can be executed on the private cloud. However, in some cases in which requested resources are not available, the resources, e.g., storage, computing, network, etc., may be requested from a public cloud. These public cloud resources are typically requested only for the purposes of satisfying a particularly large workload need, and may be released after the workload is completed. Furthermore, a resource borrowing or lease request may be submitted to another private cloud that is trusted by submitter, e.g., in case of public cloud data privacy concerns. Resource request submissions, apart from the resource available and scheduling may depend on various resources, e.g., whether the requester of the resources is a public or private cloud, whether the requester of the resources is a multi-cloud environment, etc. However, in conventional approaches, many times relatively little, if any, reasoning is applied into requesting resources from a public cloud and/or accepting resources from a public cloud. Accordingly various protocols, e.g., security protocols, of the host may be jeopardized in accepting such resources.

There is a need to dynamically identify a required resources shortage and generate a request to provision identified resources from another cloud for the duration of a task that is to be performed, e.g., to complete a training model. In sharp contrast to the deficiencies of the conventional approaches described elsewhere above, techniques of various embodiments and/or approaches described herein include building a knowledge graph to use for determining a resource vendor for temporarily leasing resources to a host system, where the leased resources satisfy policy prerequisites of the host system. According to one or more uses cases, these techniques may include considering a multi-cloud environment in a hybrid model. A private cloud may at some point be in need of certain resources. The techniques of various embodiments and approaches described herein identify resource vendors of another cloud, e.g., another private cloud, another public cloud, etc., where the resources reside. These techniques are preferably trustworthy enough to understand needs of the private cloud that is in relatively short supply of the resources, but still execute a lease on the resources present in the cloud of another realm. In some of such embodiments and approaches, the location with the requested resource accepts and provides a lease with: a number of resources, a time duration that the resources will be available for leasing, a mutual handshake that serves as a resource confirmation and enables the leasing to occur, etc. These techniques verify that a "leased cloud", e.g., resources leased from a resource vendor, follow the similar standards of privacy/security as of the cloud that is leasing the resources. With this enabled it can be ensured that provided resources maintain similar standards of resources, which may be a separate embodiment.

Figure 3:
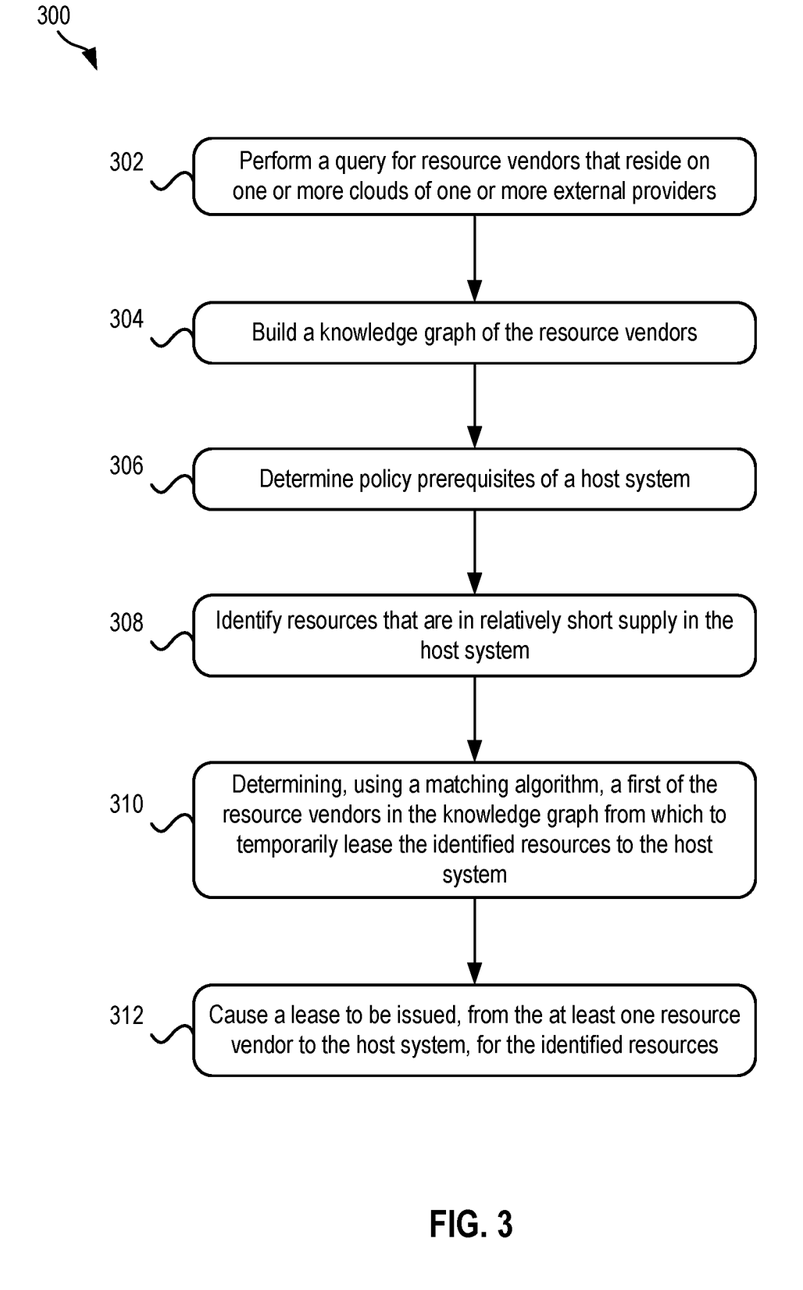
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-6B, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

For context, it may be prefaced that method 300 may be performed for ensuring that temporarily leased resources from one or more resource vendors adhere to similar privacy and/or security standards as a host system that is leasing the resources from the one or more resource vendors. In some approaches one or more of the resource vendors may be external resource vendor(s). In some other approaches, the external resources may additionally and/or alternatively be a collection of resources with a functional relationship with one another. For example, in some approaches, at least some of the resources may include different storage devices of a tiered data storage system, e.g., see FIG. 2, that are at least temporarily leased as a result of the host system running out of storage potential. More specifically, in some approaches at least one of the resource vendors may be a known type of cloud provider, which may be an external provider. In another approach, resources of the resource vendors may additionally and/or alternatively include a plurality of physical devices, e.g., computers, processors, graphics cards, etc., and therefore the resource vendors may be located on one or a plurality of cloud locations and/or hybrid cloud locations depending on the approach. Similarly, the host system may in some approaches be a host cloud, e.g., such as an original cloud provider. Note that the cloud(s) of external provider(s) that the resource vendors reside on is in some preferred approaches different than the cloud(s) of external provider(s) that the host system resides on. The external providers that include such clouds may also be different from one another in some approaches. The host system may in some approaches be defined by a finite number of resources, e.g., computing resources, data storage resources, hardware, etc., and therefore may at some point issue a request for additional resources from one or more external resource vendors.

Operation 302 includes performing a query for resource vendors that reside on one or more clouds of one or more external providers. It should be noted that in some approaches, the query is performed for all resource vendors of at least one external provider with an anticipation that at some point the external resources may become available. In some other approaches, the query may be performed for only resource vendors that are currently available. In yet another approach, the query is performed for only resource vendors that will be available at a predetermined future time, e.g., such as a predetermined time that the host system is expected to have less than a predetermined preferred amount of available resources that enables the host system to perform one or more predetermined functional operations.

In some approaches the query may be initiated by a request for resource vendors being issued by the host system. In another approach the query may be initiated preemptively, e.g., before a determination is made that one or more resources on the host system are in relatively short supply, e.g., such as in response to a determination that the one or more resources on the host system are in relatively short supply.

Results returned from the issued query may include information that specifies one or more resources that are available on the private cloud. For example, in one approach, the information includes resource vendors that have resources available and and a type of resources that are available. In another approach, such information may additionally and/or alternatively specify an amount of external resources that are available and/or a time that the resources of the resource vendors are available. In yet some other approaches, such information may additionally and/or alternatively specify policies, e.g., operating parameters and/or protocols, that the resource vendors have, e.g., e.g., security policies, privacy policies, service level agreements (SLAs), security protocols that the resource vendors follow, etc.

Operation 304 includes building a knowledge graph of the resource vendors, e.g., the resource vendors associated with the results of the performed query. In some preferred approaches, the knowledge graph includes each of the clouds having resource vendors that are uncovered in the performed query. The knowledge graph may additionally and/or alternatively include one or more policies of the resource vendors, e.g., security policies of the resource vendors, SLAs of the resource vendors, security protocols of the vendors, etc. These policies may be searchable and looked up within the knowledge graph, e.g., such as to fulfill a request for resources as will be described elsewhere below.

Building the knowledge graph of resource vendors may in some approaches include storing the resource vendors in a hierarchy within the knowledge graph. In some approaches the hierarchy is based on relative restrictiveness of policies of the resource vendors. For example, relatively most restrictive cloud policies may fall in a topmost category of a hierarchical list, and relatively least restrictive cloud policies may fall in a bottommost category of the hierarchical list. Furthermore, the hierarchical list may continue in an order of resource vendors having relatively higher security and/or privacy SLAs to resource vendors having relatively lower security and/or privacy SLAs.

In some approaches, building up a policy hierarchy list within the knowledge graph may include identifying predetermined policies within any cloud environment registered with the host system and/or registered in a network that the host system is in communication with. In one approach, such predetermined policies may include SLAs for cloud security standards based on the underlying policies. The knowledge graph of the resource vendors may additionally and/or alternatively be built using natural language processing (NLP) in some approaches. For example, one or more techniques for natural language processing (NLP) annotation that would become appreciated by one of ordinary skill in the art upon reading the descriptions herein may be used to map and define cloud security policy documents associated with the resource vendors to SLAs. Existing and incoming new policy documents may be placed in an order of decreasing relative restrictiveness within the knowledge graph in some approaches.

In some approaches, security policies may be defined in a centralized policy through NLP technologies using intelligent document ingestion and understanding of legal policy documents of the host system. In one illustrative approach such ingestion and understanding may be performed using WATSON DISCOVERY by IBM WATSON.

Lists within the knowledge graph may be maintained such that a hierarchical list may be updated in response to a determination that one or more policies of the resource vendors change.

Policy prerequisites of the host system may be determined, e.g., see operation 306. In some approaches, the policy prerequisites may include security polices of the host system, privacy policies, SLA policies of the host system, a maximum number of resource vendors that the host system accepts resources from, one or more types of resource vendors that the host system does not accept resources from, etc. For context, policy prerequisites of the host system may be determined to ensure that any leases that the host system enters into to receive resources that the host system is short supply of, have policies that about match, e.g., do not conflict with, the policy prerequisites of the host system, e.g., see operation 310 elsewhere below.

In some approaches, policy prerequisites of the host system may be determined using techniques that would become appreciated by one of ordinary skill in the art upon reading the descriptions herein. According to a more specific approach, policy prerequisites of the host system may be determined by performing a known technique for document ingestion to ingest one or more policy documents that a user of the host system has and/or is selecting. In some approaches, monitoring may be performed on such user selections and behavior associated with one or more policy documents to create and adjust such policy prerequisites. In some approaches, method 300 may include using a known type of algorithm for collecting and inputting such information into a table that is accessed in order to determine policies and restrictions associated with the host system.

In some approaches, a mapping of the host system may be built to determine policy prerequisites of the host system. According to some illustrative approaches, building a mapping of the host system may include identifying documents and policies of the host system to generate metrics about the restrictiveness of the host system. A bidirectional encoder representations from transformers (BERT) enabled entity extraction model may be utilized in some approaches to generate the knowledge graph to identify entities which refer to SLAs of the host system, and the model may place these entities into a hierarchy of the mapping of the host system. More specifically, in one or more of such approaches, the model may include inserting a classification (CLS) token at a beginning of a first sentence, and a SEP token may be inserted at the end of each sentence of a document associated with the host system, e.g., the identified documents of the host system. A sentence embedding indicating "Sentence A" or "Sentence B" may additionally and/or alternatively be added to each token. Note that sentence embeddings are similar in concept to token embeddings within a vocabulary of the current approach. A positional embedding may additionally and/or alternatively be added to each token to indicate a position of the token in a sequence. This concept may be based on contextual constraints for SLAs which may be put into place per cloud environment, e.g., such as in a multi-cloud environment defined in various approaches herein. The BERT model may be trained, e.g., using reinforcement learning algorithm(s), to identify policy prerequisites of the host system based on the inserted tokens, and thereby identify the policy prerequisites in an output of the trained BERT model.

Resources that are in relatively short supply in the host system may be identified, e.g., see operation 308. For context, relatively "short supply" may in some approaches be defined as a resource that is required by the host system to perform a next or scheduled action, e.g., of an I/O queue, but that is not currently possessed by the host system. In another example, a resource being in relatively "short supply" may in some approaches be defined where less than a predetermined amount of the resource is currently available on the host system.

In some approaches, resources that are in relatively short supply in the host system may be identified by determining an amount of resources that are available to the host system for a next predetermined amount of time. It may be determined whether an amount of resources anticipated to be needed for performing I/O operations, e.g., scheduled in am I/O queue, within the next predetermined amount of time exceed the amount of resources that are available to the host system for the next predetermined amount of time. In another approach, resources lost as a result of an occurrence of a disaster event occurring within the host system may be identified as resources that are in relatively short supply in the host system. In yet another approach, resources that are expected to go off-line within the host system as a result of one or more updates being performed within the host system may be identified as resources that are in relatively short supply in the host system.

Operation 310 includes determining at least one of the resource vendors, e.g., a first of the resource vendors, in the knowledge graph for temporarily leasing the identified resources to the host system. In some preferred approaches, a matching algorithm that would become appreciated by one of ordinary skill in the art upon reading the descriptions herein and that is configured to match the host system policy prerequisites with resource vendor policies within the knowledge graph may be used to dynamically may such a determination. Accordingly, at least one of the determined resource vendors, e.g., a first resource vendor, may have the identified resources and satisfy policy prerequisites of the host system. Note that depending on the approach, the first resource vendor may partially or fully satisfy the resources in relatively short supply on the host system. Accordingly, in response to a determination that the first resource vendor only partially satisfies the resources in relatively short supply on the host system, method 300 may optionally include determining at least a second resource vendor that satisfies a remainder of the resources that the first resource vendor does not satisfy. In such an approach, the additional resource vendors preferably also satisfy the policy prerequisites of the host system. The resource vendors that satisfy the resources in relatively short supply on the host system may be identified dynamically and thereby prevent downtime of I/O operations performed on the host system which would otherwise likely occur in response to the host system being in relatively short supply of the resources. Accordingly, the techniques of various embodiments and approaches described herein increase efficiencies of the host system by preventing I/O operations from going unfulfilled and being delayed as a result of resources not being available on the host system.

In some approaches, the one or more external resource vendor(s) determined to have the identified resources and satisfy the policy prerequisites of the host system may additionally satisfy leasing and scheduling time prerequisites of the host system. For example, in some approaches, leasing and scheduling time prerequisites of the host system may include, e.g., a minimum amount of time that the resources will be available to the host system to avoid the lease expiring before the host system is finished using the resources, a minimum amount of resources that are available to be leased, an amount of time that causing the lease to be issued for the identified resources takes (to prevent a handshake between the first resource vendor and the host system from taking more than a predetermined amount of time), etc.

In one illustrative approach, determining a resource vendor to match with the host system may include matching one or more external providers of the knowledge graph for a resource sharing handshake that establishes a lease between the two. For example, such an approach may include generating a restrictiveness score for a policy hierarchy generated in the cloud. These scores may be generated as output of an reinforcement learning model that would become appreciated by one of ordinary skill in the art upon reading the descriptions herein, and which may take into account the above parameters from a trained BERT model to determine a creative predictive output. In one approach, an agent, e.g., Agent A, may act upon an environment, e.g., Environment E, as part of a reinforcement learning model. When acted upon with a given SLA, the function parameters may set parameters that are autotuned within a given environment. This thereafter enables the reinforcement learning model to determine policy prerequisites of a host system of an environment that the agent acts on.

In another illustrative approach, determining a resource vendor to match with the host system may additionally and/or alternatively consider a transition probability, e.g., T→T {S-S'} where "T" represents transitions and "S" represents states, which indicates a change in a state of SLAs based on changing requirements that are subjected to an environment. In such an approach, a reward function may be generated that incorporates a multiplicative factor of norms followed by the agreement when agreed upon in a consensus framework that abides by predetermined company guidelines. Accordingly, a matching algorithm may be used to match policy data of an incoming cloud environment request with existing cloud policies. Such matching may be performed using the rankings generated in the knowledge graph.

In some approaches, operation 310 may include leverage matching algorithms to provide matching recommendations for a host system that is in relatively short supply of resources and a resource vendor that has such resources. This is made possible using the techniques described in various embodiments and approaches herein which, based on the analysis of parameters, incorporates optimal resource sharing, minimal resource leasing and scheduling time, and matching of the security policies based on identification of multi-cloud environments and/or hybrid cloud environments.

Operation 312 includes causing a lease to be issued, from the at least one resource vendor to the host system, for the identified resources. In some approaches, causing the lease to be issued from the at least one resource vendor to the host system includes instructing a handshake to be performed between the at least one resource vendor and the host system.

Illustrative techniques for resource scheduling in some approaches includes recording a list of past matching between resource vendors and host systems based on the policy list and cloud storage. Such matchings may optionally be stored on the host system with the knowledge graph. In some approaches, for new upcoming connections between any host system and any resource vendor within the stored information, past matching data may referenced, and based on this information, a likelihood of a policy match occurring with a resource vendor in the hierarchy may be determined. In some approaches this determination may be based on a restrictiveness as part of a reinforcement learning (RL) output, and based on the restrictiveness, a given host system may be matched and/or assigned a resource vendor from which to lease resources. For example, in response to a determination that there is at least a predetermined amount of evidence that all the policies are being matched, a request to lease out the resources of resource vendors to one or more host systems may be made.

Figure 4A:
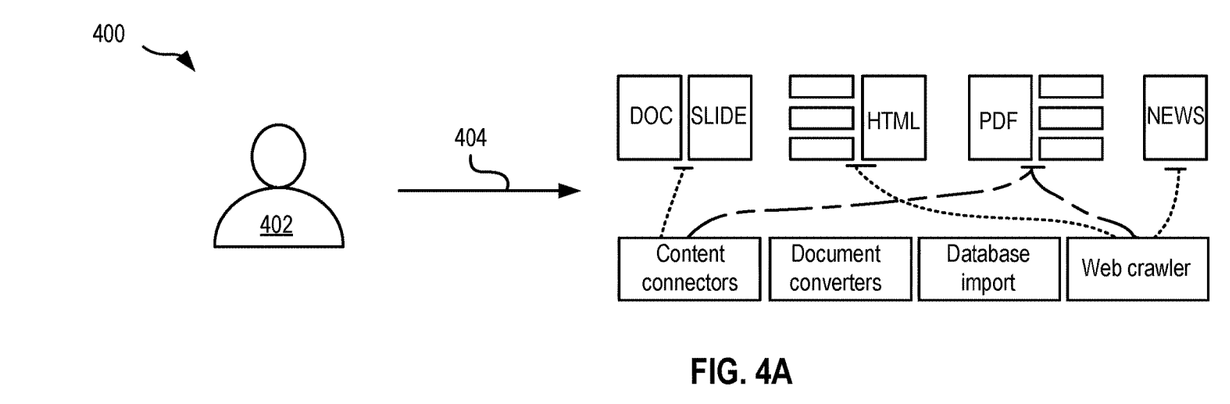
FIGS. 4A-4C depict a progression of a representational architecture, in accordance with several embodiments.
Figure 4B:
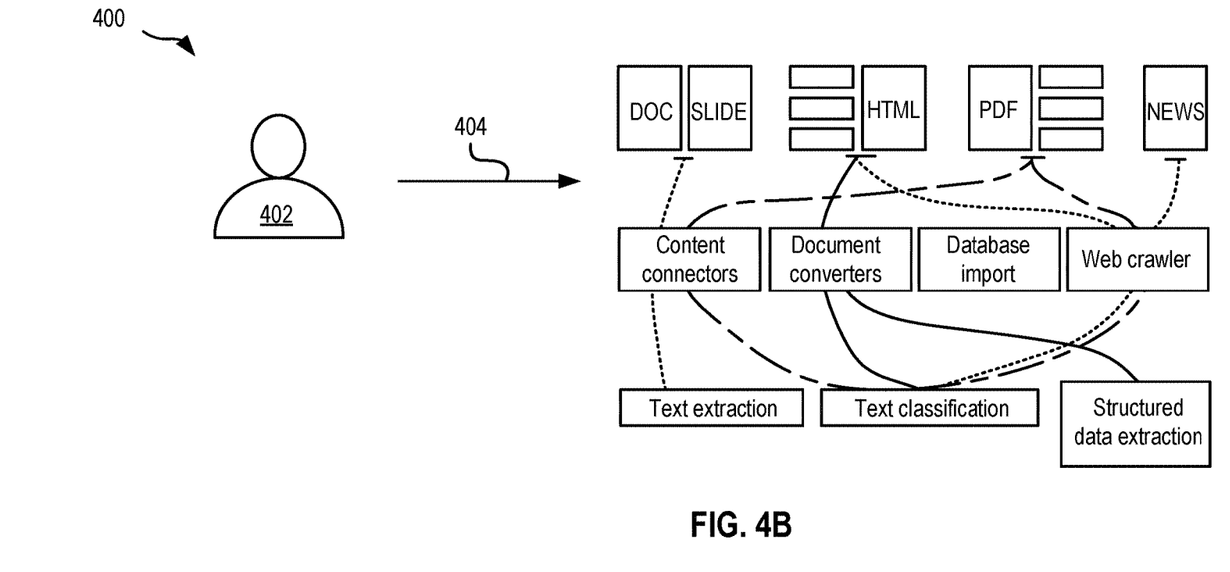
Figure 4C:
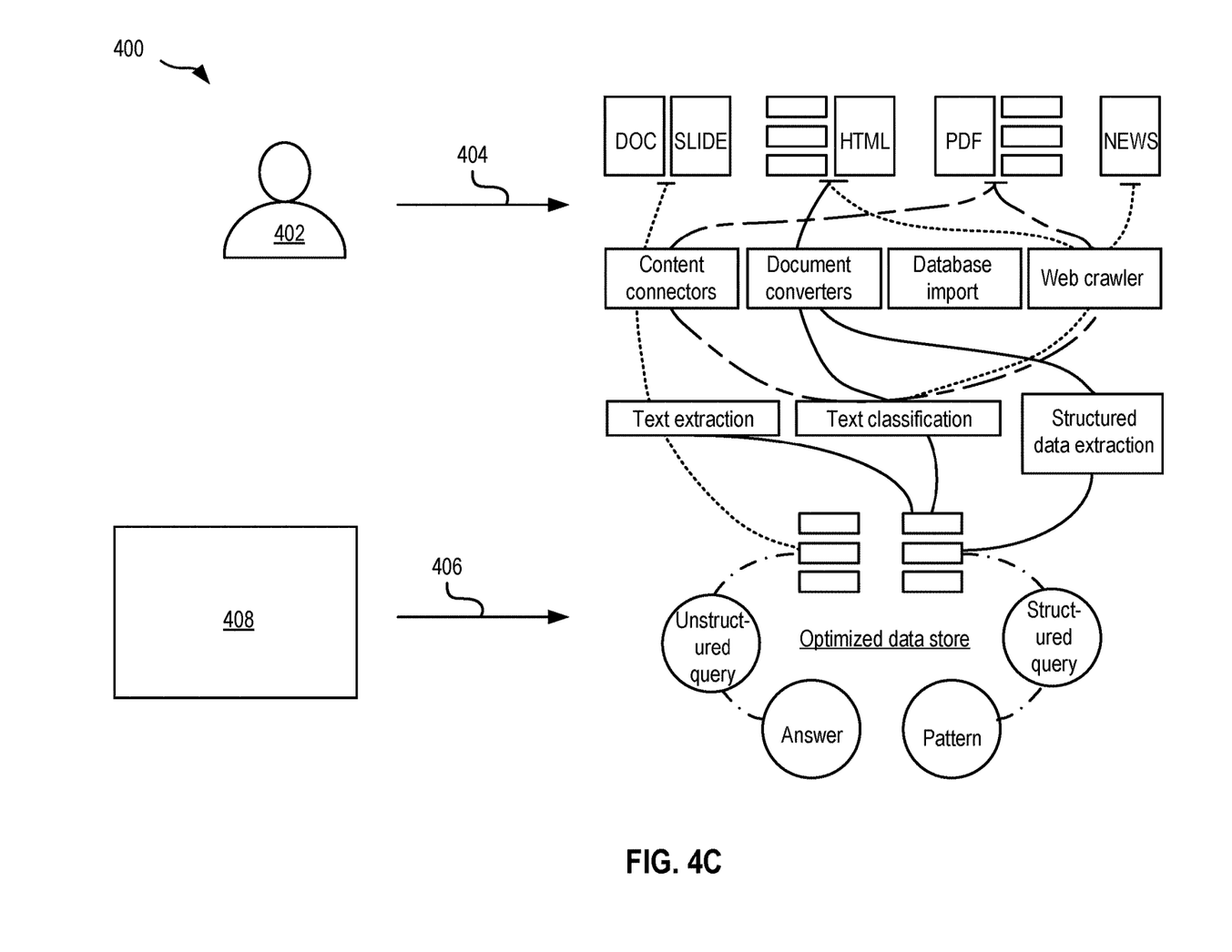

FIGS. 4A-4C depict a representational architecture 400, in accordance with various embodiments. As an option, the present representational architecture 400 may be implemented in conjunction with features from any other embodiment listed herein, such as those described with reference to the other FIGS. Of course, however, such representational architecture 400 and others presented herein may be used in various applications and/or in permutations which may or may not be specifically described in the illustrative embodiments listed herein. Further, the representational architecture 400 presented herein may be used in any desired environment.

It should be prefaced that FIGS. 4A-4C depict a progression of building and using a knowledge graph for determining a resource vendor from which a host system at least temporarily lease resources. It should also be noted that various lines illustrating a logical flow of this progression include different line patterns for simplified viewing purposes.

Document ingestion is illustrated in the representational architecture 400 of FIG. 4A. Specifically, as a user 402 makes selections 404 of one or more documents, e.g., see DOC, SLIDE, HTML, PDF, and NEWS, policies of a host system that includes a user device that the user selections are received on are identified. Resources in relatively short supply on the host system may also be identified using one or more of the techniques described in method 300.

Referring now to FIG. 4B, an enrichment of the document ingestion is achieved through models trained to identify and extract policies of the host system, e.g., security rules, policy details, SLAs, etc. These models may include information sourced from the host system, e.g., content connectors, document converters, database imports, web crawlers, text extraction, text classification, structured data extraction, etc.

With reference now to FIG. 4C, a knowledge graph of resource vendors is built. Specifically, building the knowledge graph may include building a list of policies and SLAs. A top of the list may contain relatively most restrictive policies. In contrast, a bottom of the list may contain relatively least restrictive policies. This list of the knowledge graph contains the policies which resource vendors of a cloud environment are most likely to share and lease out as resources. In some approaches, building the graph includes performing a query on the resource vendors, e.g., see unstructured query and structured query, to determine resource vendors that include resources to lease to the host system and/or policies of the resource vendors. Results 408 of the query which may include security policy rules, SLAs cloud security, etc., may be incorporated into the graph in operation 406, e.g., see answer and pattern. These results may be stored on a known type of storage device using a known type of data storage operation, e.g., see optimized data store.

In some approaches, resource vendor(s) that have resources which can partially or completely provide resources that are needed by the host system may be determined, e.g., using a predetermined matching algorithm. The determined resource vendor(s) preferably validate the policies of the host system, e.g., security prerequisites, privacy prerequisites, SLA prerequisites. In some approaches, trade-offs of contacting cloud environments may be identified and considered. For example, such a tradeoff may include a resource vendor with relatively more efficient resource lending and leasing capabilities, but the resource vendor may also have relatively more restrictive resource sharing policies. The relatively more restrictive resource sharing policies may lead to throttling or other inefficiencies based on, e.g., privacy issues, security issues, SLA mismatch issues, hybrid cloud/multi-cloud specific policies, etc. Tradeoff mitigating factors to mitigate these inefficiencies may be calculated using techniques that would become appreciated by one of ordinary skill in the art upon reading the descriptions herein. For example, overall net beneficial clouds may be contacted in some approaches as a tradeoff mitigating factor. Another tradeoff mitigating factor includes updating and sharing the security/privacy policies along with SLA descriptions that are to be updated to enable the host system to also participate in resource sharing thereafter.

Figure 5:
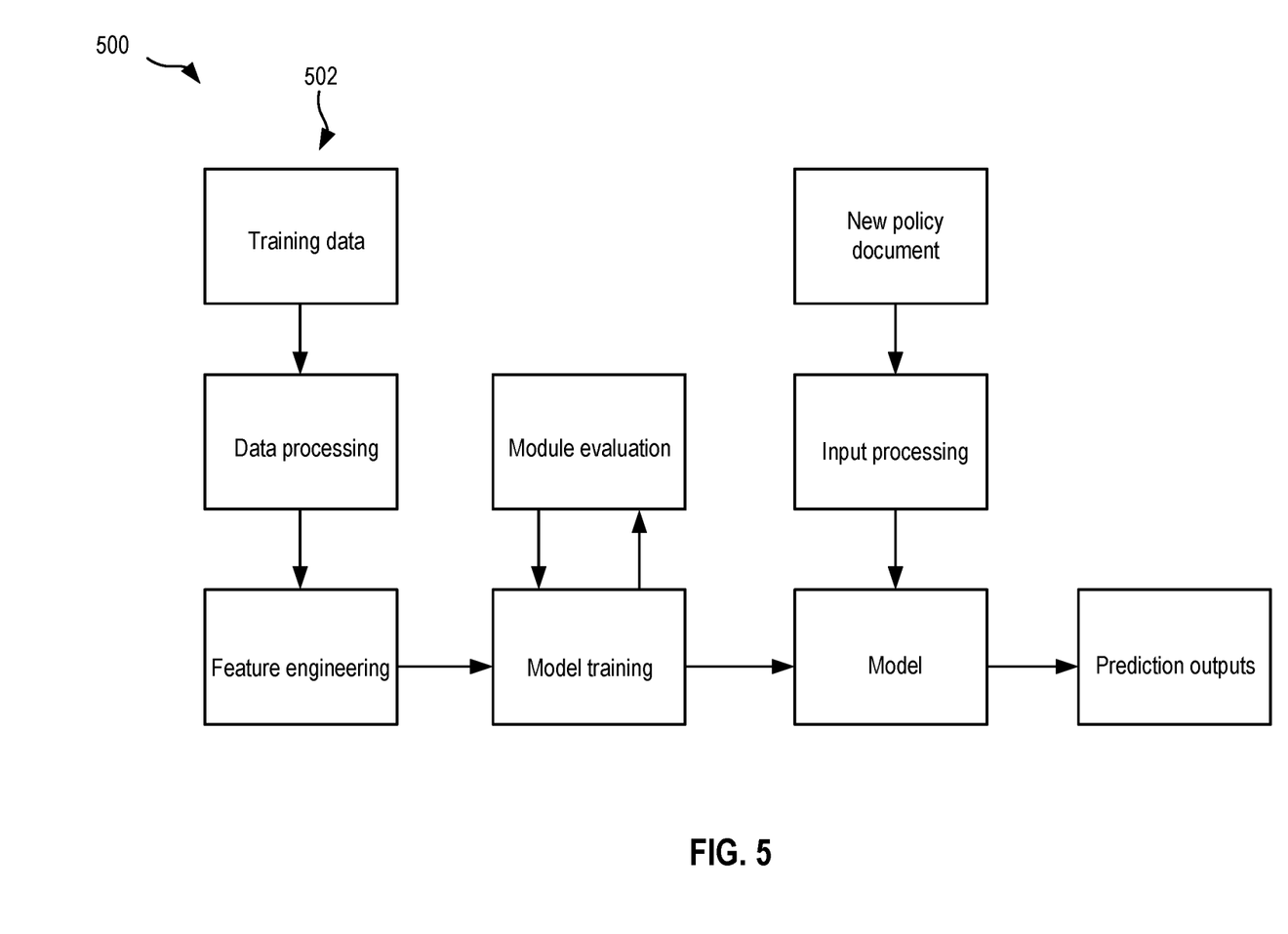
FIG. 5 is a flowchart of a process, in accordance with one embodiment of the present invention.

FIG. 5 depicts a flowchart of a process 500, in accordance with one embodiment. As an option, the present process 500 may be implemented in conjunction with features from any other embodiment listed herein, such as those described with reference to the other FIGS. Of course, however, such process 500 and others presented herein may be used in various applications and/or in permutations which may or may not be specifically described in the illustrative embodiments listed herein. Further, the process 500 presented herein may be used in any desired environment.

Process 500 includes a sub-process 502 for evaluating training a BERT model using past training policy data. For example, a plurality of documents, e.g., such as contracts and legal documents may be provided as the training data. In some approaches, training data may be processed, e.g., see data processing, to establishing a base model that is thereafter trained to establish the BERT model, e.g., see Feature engineering proceed to model training. In the model training, the base model may be trained to convert documents to a standard format and then known type of enrichments may be run on the documents to generate annotations on the contract. During this training, e.g., see Model evaluation, the contracts may be shown to subject matter experts (SMEs) which may include known types of SME algorithms, which are configured to identify appropriate terms for a contract. This way, the BERT model is provided feedback that is incorporated into reinforcement learning, e.g., out of 100 labels 20 are identified by the model as needing to be changed. The trained BERT model, e.g., see Model, is ready to be used subsequent to passing at least a predetermined threshold of accuracy in the model training. At this point, input processing may be performed on a new policy document which may be input into the trained BERT model, e.g., see Model. The BERT model may output predicted outputs. This model may be tailored to determine, using a matching algorithm of the model, a resource vendors in a knowledge graph for temporarily leasing resources to a host system based on the determination that the resource vendor includes identified resources and satisfies policy prerequisites of the host system.

Figure 6A:
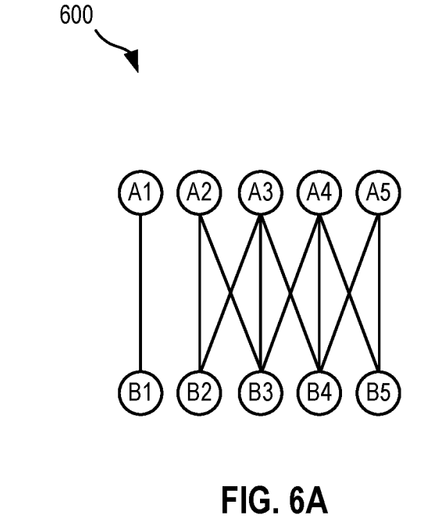
FIGS. 6A-6B depict representational architectures, in accordance with various embodiments.
Figure 6B:
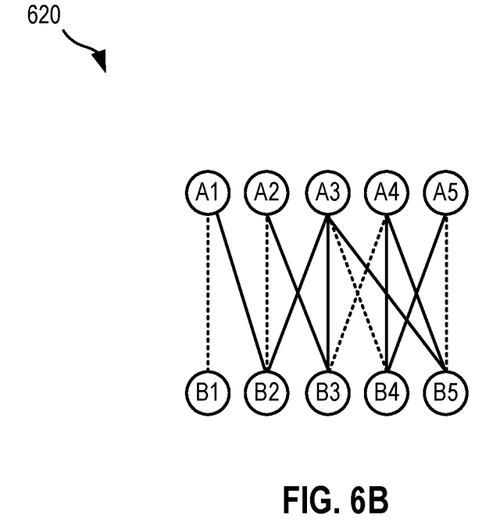

FIGS. 6A-6B depict representational architectures 600, 620 in accordance with several embodiments. As an option, the present architectures 600, 620 may be implemented in conjunction with features from any other embodiment listed herein, such as those described with reference to the other FIGS. Of course, however, such architectures 600, 620 and others presented herein may be used in various applications and/or in permutations which may or may not be specifically described in the illustrative embodiments listed herein. Further, the architectures 600, 620 presented herein may be used in any desired environment.

It may be prefaced that FIGS. 6A-6B illustrate a potential for matching based on policy restrictions as determined by a build knowledge graph. For example, referring first to architecture 600 of FIG. 6A, an initial knowledge graph is built without considering policies of host systems, e.g., see host systems B1-B5 having leases, e.g., see lines of FIG. 6A with various resource vendors A1-A5. In contrast, referring now architecture 620 to FIG. 6B, leases of resource vendors otherwise present in architecture 600 are not present in architecture 620. For example, it should be noted that the dashed lines indicate leases that are not allowed to be made between various host systems and resource vendors, and the solid lines indicate leases that are allowed to be made between various host systems and resource vendors. The leases that are allowed to be made, are allowed based on a determination, e.g., based on a knowledge graph, that the at least one resource vendor includes resources identified to be needed by a given host system and that policy prerequisites of the host system match policies of the at least one resource vendor, e.g., see B2 and A1, B2 and A3, B3 and A2, B4 and A5, B5 and A3, and B5 and A4. In contrast, the leases that are not allowed to be made, are not allowed based on a determination, e.g., based on a knowledge graph, that the resource vendor do not include resources identified to be needed by the host system and/or that policy prerequisites of the host system are not matched by policies of the resource vendors, e.g., see B1 and A1, B2 and A2, B3 and A4, B4 and A3, and B5 and A5.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
building a searchable knowledge graph of resource vendors that each reside on a different cloud of a multi-cloud environment;
identifying resources that are in relatively short supply in a host system,
wherein the host system resides on a first cloud of a different provider than external providers associated with the clouds that the resource vendors reside on,
wherein the first cloud is different than the clouds that the resources vendors reside on;
determining, using a matching algorithm, a first of the resource vendors in the knowledge graph from which to temporarily lease the identified resources to the host system, wherein the first resource vendor includes the identified resources and satisfies policy prerequisites of the host system; and
causing a lease to be issued, from the first resource vendor to the host system, for the identified resources.

2. The method of claim 1, wherein building the knowledge graph of resource vendors includes storing the resource vendors in a hierarchy within the knowledge graph based on relative restrictiveness of policies of the resource vendors, wherein storing the resource vendors in the hierarchy includes: storing the relatively most restrictive cloud policies in a topmost category of the knowledge graph, and storing the relatively least restrictive cloud policies in a bottommost category of the knowledge graph.

3. The method of claim 2, wherein the relative restrictiveness of the cloud policies of the resource vendors are based on: security policies, privacy policies, and service level agreements (SLAs), wherein storing the resource vendors in the hierarchy includes: storing the policies having relatively higher security and privacy SLAs to relatively higher categories of the knowledge graph than categories of the knowledge graph to which resource vendors having relatively lower security and privacy SLAs are stored.

4. The method of claim 1, wherein the policy prerequisites include security polices of the host system, privacy policies, and service level agreement (SLA) policies of the host system, wherein the first cloud is a private cloud, wherein the clouds that the resource vendors reside on are public clouds.

5. The method of claim 1, wherein the knowledge graph of the resource vendors is built using natural language processing (NLP) wherein the resources that are identified to be in relatively short supply in the host system are resources that are expected to go off-line within the host system as a result of update(s) being performed within the host system.

6. The method of claim 1, wherein the first resource vendor satisfies leasing and scheduling time prerequisites of the host system wherein the leasing and scheduling time prerequisites of the host system include a minimum amount of resources that are available to be leased, and an amount of time that causing the lease to be issued takes, wherein the amount of time that causing the lease to be issued takes includes an amount of time that performing a resource sharing handshake between the first resource vendor and the host system takes, wherein the resource sharing handshake establishes a lease between the first resource vendor and the host system.

7. The method of claim 6, comprising:
building a mapping of the host system to determine the policy prerequisites of the host system,
wherein building the mapping includes:
identifying documents and policies of the host system to generate metrics about a restrictiveness of the host system; and
using a bidirectional encoder representations from transformers (BERT) enabled entity extraction model to generate the knowledge graph to identify entities which refer to service level agreements (SLAs) of the host system,
wherein the BERT enabled entity extraction model inserts a classification (CLS) token at a beginning of first sentences of the identified documents,
wherein the BERT enabled entity extraction model inserts separate (SEP) tokens at an end of each sentence of the identified documents,
wherein the BERT enabled entity extraction model adds a sentence embedding to each of the tokens,
wherein the BERT enabled entity extraction model adds a positional embedding to each of the tokens;
training the BERT enabled entity extraction model using reinforcement learning algorithm(s), to identify policy prerequisites of the host system based on the tokens;
identifying the policy prerequisites in an output of the trained BERT enabled entity extraction model;
generating restrictiveness scores for the identified policy prerequisites; and
storing the resource vendors in a hierarchy within the knowledge graph based on the restrictiveness scores.

8. A computer program product, the computer program product comprising a computer readable storage medium having program instructions embodied therewith, the program instructions readable and/or executable by a computer to cause the computer to:
build, by the computer, a searchable knowledge graph of resource vendors that each reside on a different cloud of a multi-cloud environment;
identify, by the computer, resources that are in relatively short supply in a host system,
wherein the host system resides on a first cloud of a different provider than external providers associated with the clouds that the resource vendors reside on,
wherein the first cloud is different than the clouds that the resources vendors reside on;

determine, by the computer, using a matching algorithm, a first of the resource vendors in the knowledge graph from which to temporarily lease the identified resources to the host system, wherein the first resource vendor includes the identified resources and satisfies policy prerequisites of the host system; and cause, by the computer, a lease to be issued, from the first resource vendor to the host system, for the identified resources.

9. The computer program product of claim 8, wherein building the knowledge graph of resource vendors includes storing the resource vendors in a hierarchy within the knowledge graph based on relative restrictiveness of policies of the resource vendors, wherein storing the resource vendors in the hierarchy includes: storing the relatively most restrictive cloud policies in a topmost category of the knowledge graph, and storing the relatively least restrictive cloud policies in a bottommost category of the knowledge graph.

10. The computer program product of claim 9, wherein the relative restrictiveness of the cloud policies of the resource vendors are based on: security policies, privacy policies, and service level agreements (SLAs), wherein storing the resource vendors in the hierarchy includes: storing the policies having relatively higher security and privacy SLAs to relatively higher categories of the knowledge graph than categories of the knowledge graph to which resource vendors having relatively lower security and privacy SLAs are stored.

11. The computer program product of claim 8, wherein the policy prerequisites include security polices of the host system, privacy policies, and service level agreement (SLA) policies of the host system, wherein the first cloud is a private cloud, wherein the clouds that the resource vendors reside on are public clouds.

12. The computer program product of claim 8, wherein the knowledge graph of the resource vendors is built using natural language processing (NLP), wherein the resources that are identified to be in relatively short supply in the host system are resources lost as a result of an occurrence of a disaster event occurring within the host system.

13. The computer program product of claim 8, wherein the first resource vendor satisfies leasing and scheduling time prerequisites of the host system, wherein the leasing and scheduling time prerequisites of the host system include a minimum amount of resources that are available to be leased, and an amount of time that causing the lease to be issued takes, wherein the amount of time that causing the lease to be issued takes includes an amount of time that performing a resource sharing handshake between the first resource vendor and the host system takes, wherein the resource sharing handshake establishes a lease between the first resource vendor and the host system.

14. The computer program product of claim 13, the program instructions readable and/or executable by the computer to cause the computer to:

build a mapping of the host system to determine the policy prerequisites of the host system, wherein building the mapping includes:

identifying documents and policies of the host system to generate metrics about a restrictiveness of the host system; and using a bidirectional encoder representations from transformers (BERT) enabled entity extraction model to generate the knowledge graph to identify entities which refer to service level agreements (SLAs) of the host system, wherein the BERT enabled entity extraction model inserts a classification (CLS) token at a beginning of first sentences of the identified documents, wherein the BERT enabled entity extraction model inserts separate (SEP) tokens at an end of each sentence of the identified documents, wherein the BERT enabled entity extraction model adds a sentence embedding to each of the tokens, wherein the BERT enabled entity extraction model adds a positional embedding to each of the tokens;

train the BERT enabled entity extraction model using reinforcement learning algorithm(s), to identify policy prerequisites of the host system based on the tokens;

identify the policy prerequisites in an output of the trained BERT enabled entity extraction model;

generate restrictiveness scores for the identified policy prerequisites; and store the resource vendors in a hierarchy within the knowledge graph based on the restrictiveness scores.

15. A system, comprising:

a processor; and logic integrated with the processor, executable by the processor, or integrated with and executable by the processor, the logic being configured to:

build a knowledge graph of resource vendors, wherein building the knowledge graph of resource vendors includes storing the resource vendors in a hierarchy within the knowledge graph based on relative restrictiveness of policies of the resource vendors;

identify resources that are in relatively short supply in a host system;

determine using a matching algorithm, a first of the resource vendors in the knowledge graph from which to temporarily lease the identified resources to the host system, wherein the first resource vendor includes the identified resources and satisfies policy prerequisites of the host system; and cause a lease to be issued, from the first resource vendor to the host system, for the identified resources.

16. The system of claim 15, wherein the resource vendors each reside on a different cloud of a multi-cloud environment, wherein the host system resides on a first cloud of a different provider than external providers associated with the clouds that the resource vendors reside on, wherein the first cloud is different than the clouds that the resources vendors reside on.

17. The system of claim 16, wherein the policy prerequisites include security polices of the host system, privacy policies, and service level agreement (SLA) policies of the host system, wherein the first cloud is a private cloud, wherein the clouds that the resource vendors reside on are public clouds.

18. The system of claim 17, wherein the first resource vendor satisfies leasing and scheduling time prerequisites of the host system, wherein the leasing and scheduling time prerequisites of the host system include a minimum amount of resources that are available to be leased, and an amount of time that causing the lease to be issued takes, wherein the amount of time that causing the lease to be issued takes includes an amount of time that performing a resource sharing handshake between the first resource vendor and the host system takes, wherein the resource sharing handshake establishes a lease between the first resource vendor and the host system.

19. The system of claim 18, the logic being configured to:
build a mapping of the host system to determine the policy prerequisites of the host system,
wherein building the mapping includes:
identifying documents and policies of the host system to generate metrics about a restrictiveness of the host system; and
using a bidirectional encoder representations from transformers (BERT) enabled entity extraction model to generate the knowledge graph to identify entities which refer to service level agreements (SLAs) of the host system,
wherein the BERT enabled entity extraction model inserts a classification (CLS) token at a beginning of first sentences of the identified documents,
wherein the BERT enabled entity extraction model inserts separate (SEP) tokens at an end of each sentence of the identified documents,
wherein the BERT enabled entity extraction model adds a sentence embedding to each of the tokens,
wherein the BERT enabled entity extraction model adds a positional embedding to each of the tokens;
train the BERT enabled entity extraction model using reinforcement learning algorithm(s), to identify policy prerequisites of the host system based on the tokens;
identify the policy prerequisites in an output of the trained BERT enabled entity extraction model;
generate restrictiveness scores for the identified policy prerequisites; and
store the resource vendors in a hierarchy within the knowledge graph based on the restrictiveness scores.

* * * * *